(12) United States Patent
Pisaniello et al.

(10) Patent No.: US 7,850,205 B2
(45) Date of Patent: Dec. 14, 2010

(54) SEATBELT RESTRAINT

(75) Inventors: Luigi Luke Pisaniello, Allenby Gardens (AU); Marcel Paul Stephan, Allenby Gardens (AU)

(73) Assignee: Lifebelt Pty Limited, Dulwich (AU)

( * ) Notice: Subject to any disclaimer, the term of this patent is extended or adjusted under 35 U.S.C. 154(b) by 251 days.

(21) Appl. No.: 12/225,339

(22) PCT Filed: Dec. 18, 2006

(86) PCT No.: PCT/AU2006/001918

§ 371 (c)(1),
(2), (4) Date: Sep. 19, 2008

(87) PCT Pub. No.: WO2007/070930

PCT Pub. Date: Jun. 28, 2007

(65) Prior Publication Data

US 2010/0084845 A1    Apr. 8, 2010

(30) Foreign Application Priority Data

Dec. 19, 2005    (AU) ............................... 2005907114

(51) Int. Cl.
  *B60R 22/00*    (2006.01)
(52) U.S. Cl. .................... 280/801.1; 280/803; 280/808; 297/468; 297/483
(58) Field of Classification Search ............. 280/801.1, 280/801.2, 803, 804, 808; 297/468, 483
See application file for complete search history.

(56) References Cited

U.S. PATENT DOCUMENTS

| 5,624,135 | A | 4/1997 | Symonds |
| 6,817,629 | B2 * | 11/2004 | Herberg et al. ........... 280/801.1 |
| 7,011,341 | B2 * | 3/2006 | Herberg et al. ............. 280/807 |
| 7,059,445 | B2 * | 6/2006 | Higuchi et al. ............. 180/268 |
| 7,628,349 | B2 * | 12/2009 | Clute et al. ............. 242/378.4 |
| 7,716,795 | B2 * | 5/2010 | Versellie et al. ........... 24/593.1 |
| 7,731,237 | B2 * | 6/2010 | Eusebi ..................... 280/808 |
| 7,775,557 | B2 * | 8/2010 | Bostrom et al. ......... 280/801.1 |
| 2004/0070191 | A1 * | 4/2004 | Higuchi et al. ............. 280/808 |
| 2005/0035587 | A1 | 2/2005 | Sexton |

FOREIGN PATENT DOCUMENTS

| JP | 2001018746 A | 1/2001 |
| JP | 2003200815 A | 7/2003 |

* cited by examiner

*Primary Examiner*—Toan C To
(74) *Attorney, Agent, or Firm*—Renner, Kenner, Greive, Bobak, Taylor & Weber (57) ABSTRACT

Part of a seat belt, anchored at the top of the seat, adopts a conventional sash/belt arrangement (2a, 2c). The other end of the belt, however, passes under the seat base and protrudes up on the opposite side of the seat base to the above anchorage point. This other end carries a buckle to receive a conventional tongue which slides along the belt. Thus, in use, the belt encircles user's thighs (22) and the seat squab. In an accident a pretensioner activates which tightens the belt, somewhat raising and curling seat squab and user's legs (22), so preventing "submarining" (ie sliding of the user out from under the belt). Alternatively an existing lap/sash belt may be augmented by an extra belt passing from the seat top, across the chest, and around one thigh of the wearer.

16 Claims, 12 Drawing Sheets

SEATBELT RESTRAINT

TECHNICAL FIELD

The present disclosure relates to a seat belt restraint.

BACKGROUND ART

In this specification unless the contrary is expressly stated, where a document, act or item of knowledge is referred to or discussed, this reference or discussion is not to be construed as an admission that the document, act or item of knowledge or any combination thereof was at the priority date, publicly available, known to the public, part of common general knowledge; or known to be relevant to an attempt to solve any problem with which this specification is concerned.

The three-point seat belt retains the wearer in their seat while spreading the energy of a collision over some of the body's hard points, such as the chest, pelvis, and shoulders.

It has been found however that it is possible for a person wearing a three-point seat belt to 'submarine' out of the belt in the event of a collision.

Submarining is the term used to describe the action when a vehicle occupant slides out from under their seat belt during a collision. Submarining can cause serious, even life threatening injuries to the legs, spine and internal organs. Children and small adults are particularly prone to submarining out of their seat belts in a collision.

Five and six point harness systems prevent submarining by using one and two crotch straps respectively, but this is neither comfortable nor convenient for everyday use.

It is an object of the present invention therefore to provide a seat belt restraint that reduces the likelihood of the wearer submarining out of their belt, or at the least, provides a useful alternative to the seat belts of the prior art.

Other objects and advantages of the present invention will become apparent from the following description, taken in connection with the accompanying drawings, wherein, by way of illustration and example, an embodiment of the present invention is disclosed.

DISCLOSURE OF THE INVENTION

In one aspect of the present disclosure there is proposed a seat belt restraint including a single, continuous length of belt supporting at least two releasably engageable portions of a seat belt buckle.

Another aspect of the present disclosure includes a seat assembly including a seat belt restraint that further includes a single, continuous length of belt supporting at least two releasably engageable portions of a seat belt buckle.

Preferably, the seat belt restraint including a belt having a first end fixed to an anchor point, a second end retaining a first portion of a seat belt buckle, and a second portion of a seat belt buckle that is adapted to releasably engage the first portion of the seat belt buckle, said second portion being retained by the belt so that it is free to slide along the belt.

Preferably, a portion of the belt passes beneath a portion of the wearers seat, so that the anchor point and the first portion of the buckle are on opposite sides of the seat when not in use.

Preferably, the first portion of the seat belt buckle is adapted to receive part of the second portion in a releasable engagement.

Preferably, the wearer's seat includes a base portion and a back portion.

Preferably, a portion of the seat belt passes beneath the base of the wearers seat.

Preferably, the base of the wearers seat is adapted to be curled up around their legs when a belt pretensioner deploys.

Preferably, the first portion of the seat belt buckle is a receiving portion, and the second portion is an insertion portion that is adapted to releasably engaged by the receiving portion.

Preferably, the anchor point comprises an inertia reel mechanism.

Preferably, the inertia reel mechanism includes a belt pretensioner.

Preferably there is an anchored belt guide positioned at or toward each side of the base of the wearers seat.

Preferably, the anchored belt guides are mounted to a base portion of the seat frame.

Preferably, in use the lower part of the lap belt sits anterior to the "sit" or ischial bones, while the upper lap sits anterior to the "pelvic" or iliac bones.

Preferably, the seat belt restraint includes a belt guide, over which the belt passes, the guide being support by biasing means.

Preferably, when the belt pretensioner activates, the belt guide is pulled downward against the biasing means so as to increase the extent to which the belt wraps over the shoulder of the wearer.

Preferably, the inertia reel mechanism and belt guide are mounted to the seat frame. This creates what we call a seat module.

Another aspect of the present disclosure includes a method of wearing the seat belt described above, wherein a portion of the belt passes beneath the wearers seat so that the receiving portion of the buckle is accessible to a first side of the wearer, and the insertion portion of the buckle is drawn from the other side of the wearer and releasably engaged by the receiving portion, thereby looping the belt around the legs of the wearer and the seat portion beneath their legs.

In a further form, the belt is wrapped around a leg of the wearer, and the two portions of the seat belt buckle are engaged.

Preferably, the belt is worn in conjunction with a standard three-point belt.

Preferably, the belt passes beneath the lap portion of the standard three-point belt.

Preferably, the belt is adapted to be retrofitted to a vehicle.

Preferably, the anchor point for the belt is a mount point for a baby capsule.

Another aspect of the present disclosure includes a method of wearing the seat belt described above, wherein the belt is wrapped around a leg of the wearer, and the two portions of the seat belt buckle are releasably engaged.

Another aspect of the present disclosure includes a kit of parts for the seat belt restraint described above.

Yet another aspect of the present disclosure includes a seat belt including a portion adapted to loop around a leg of a wearer.

In this respect, before explaining at least one embodiment of the invention in detail, it is to be understood that the invention is not limited in its application to the details of construction and to the arrangements of the components set forth in the following description or illustrated in the drawing. The invention is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings, which are incorporated in and constitute a part of this specification, illustrate certain embodiments of the invention, and together with the description, serve to explain the principles of the invention.

Those skilled in the art will appreciate that the conception upon which this disclosure is based may readily be utilised as a basis for designing other structures, methods, and systems for carrying out the several purposes of the present invention. It is important, therefore, to recognize that the claims should be regarded as including such equivalent constructions insofar as they do not depart from the spirit and scope of the present invention.

BRIEF DESCRIPTION OF THE DRAWINGS

For a better understanding of this disclosure it will now be described with respect to one or more exemplary embodiments, which shall be described herein with the assistance of drawings wherein.

DETAILED DESCRIPTION OF THE INVENTION

Figure 1:
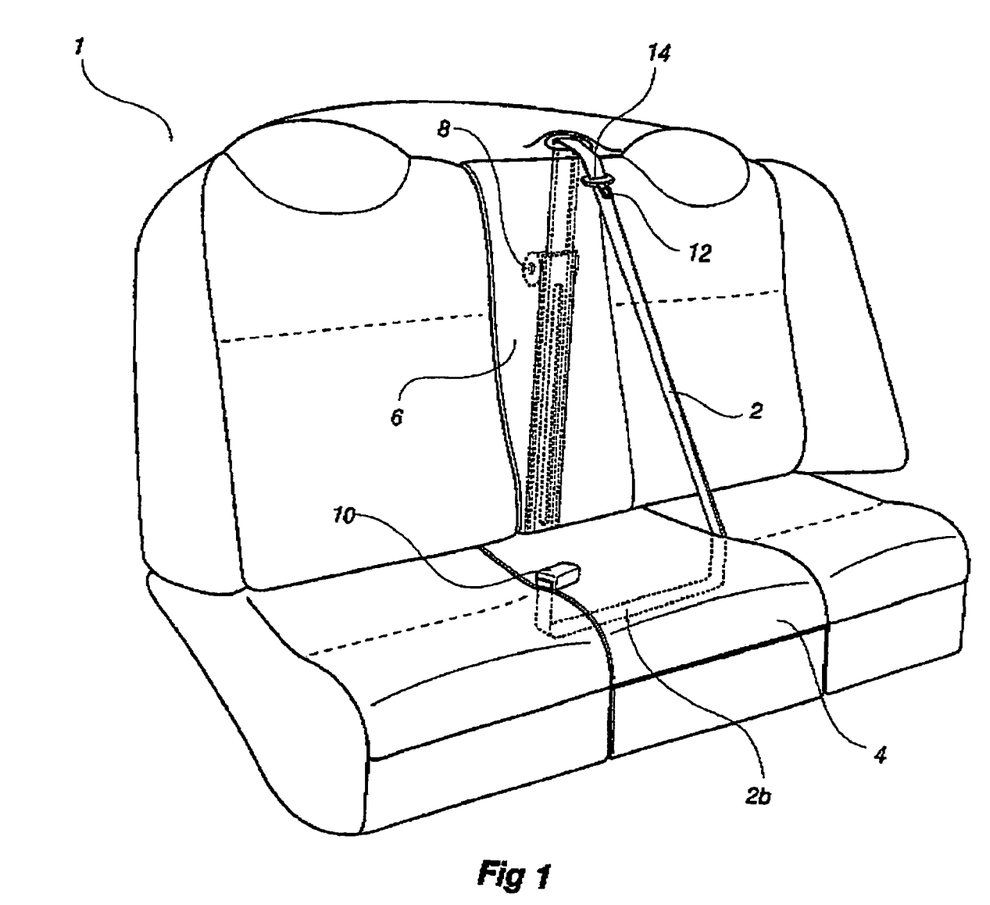
FIG. 1 is a perspective view of an exemplary vehicle seat incorporating a seat belt.

Referring now to FIG. 1, where an exemplary embodiment of a seat belt restraint and seat assembly is illustrated. Specifically, FIG. 1 illustrates a vehicle seat 1 and a seat belt 2 for securing a wearer in the seat 1. The seat 1 includes a base portion 4 and a back portion 6.

The seat belt 2 has a first end that is anchored to the vehicle via an inertia-reel mechanism 8. A second end of the belt retains a receiving portion 10 of a seat belt buckle.

The inertia reel mechanism 8 is mounted to the seat frame (not shown). The belt is routed up from the reel 8 and passes over a belt guide 100 (see FIG. 3).

Figure 3:
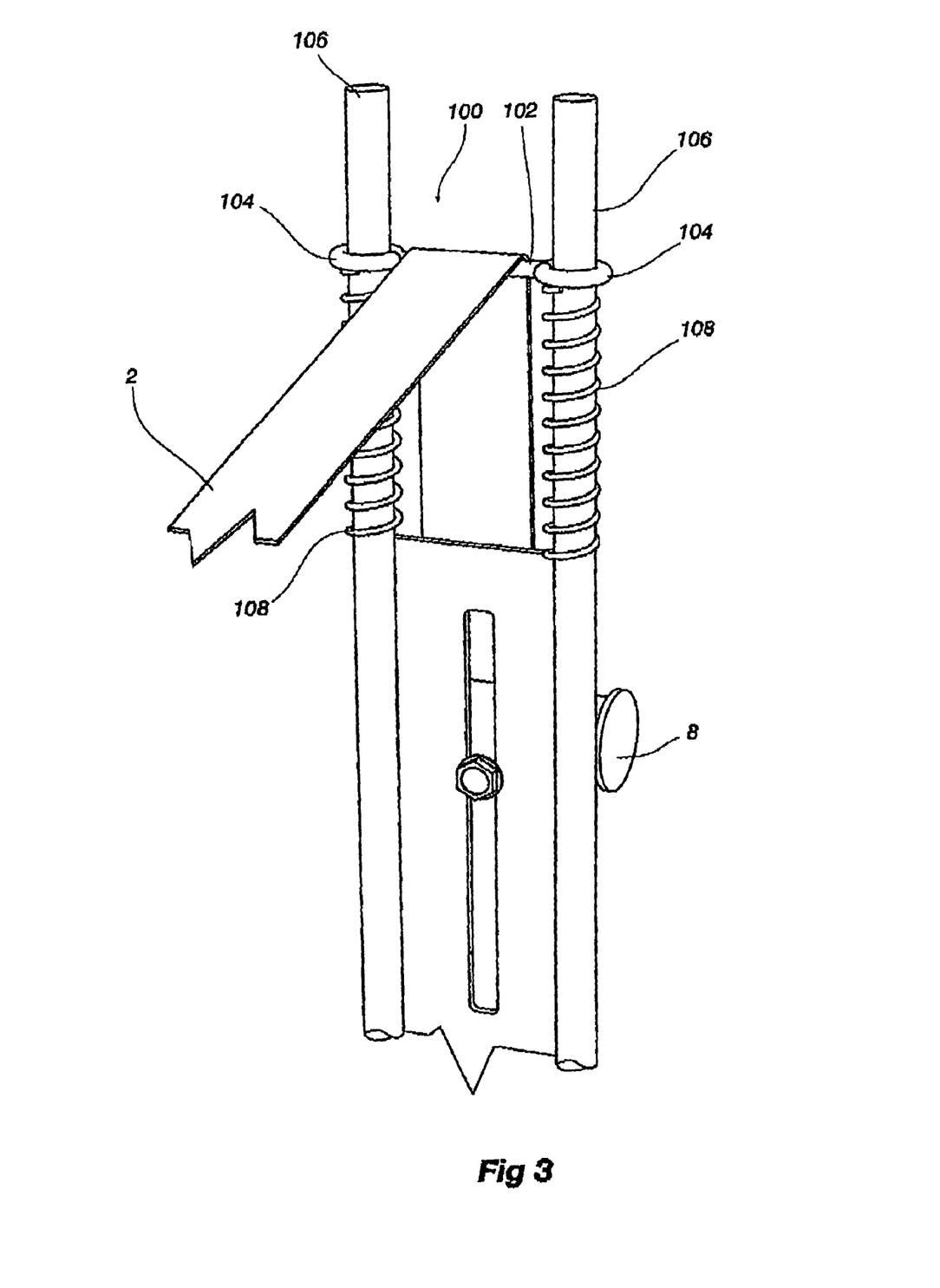
FIGS. 3 and 4 are detailed perspective views of a seat belt guide for the seat belt shown in FIG. 1.
Figure 4:
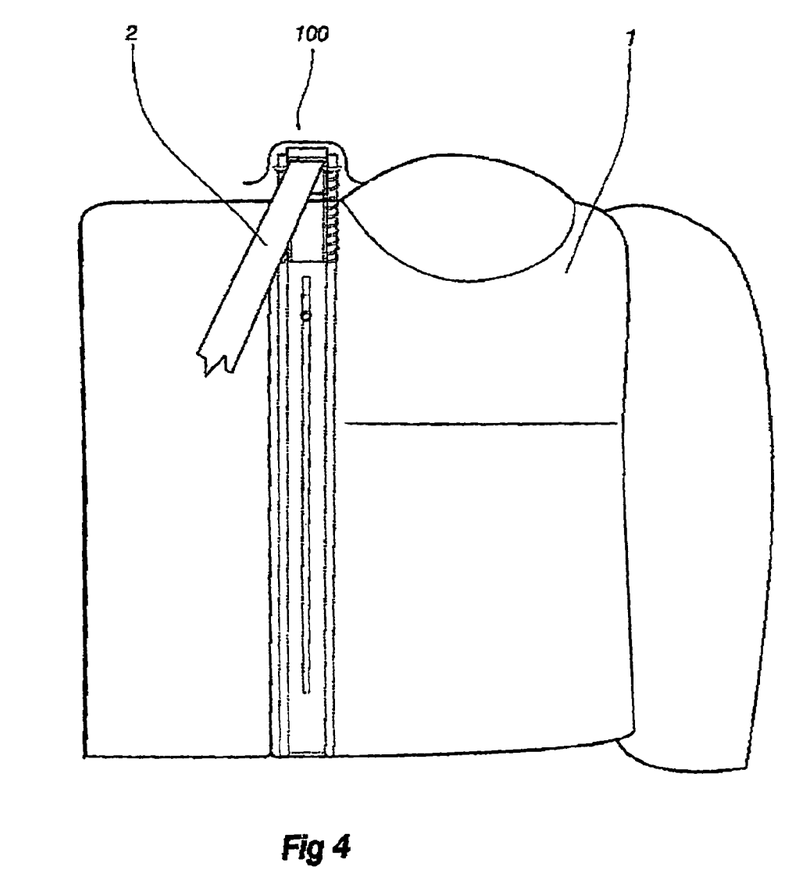

The belt guide is a bar 102 with eyelets 104 formed into each of its ends, each of which runs on a rail 106 that is fixed to the seat frame. Each of the eyelets 104 rests atop a fully extended spring 108 that has been coiled around the rail 106.

A portion of the seat belt 2b then passes through a passageway beneath a base cushion 4 of the wearer's seat 1, so that the anchor point 8 and the receiving portion 10 of the buckle are on opposite sides of the seat base portion 4 when the belt is not in use. This base portion 4 is a cushion that is firmly secured to the vehicle.

There is an insertion portion 12 of the belt buckle, which is adapted to be received by and releasably engaged with the receiving portion 10. This insertion portion 12 has a slot through it, through which the seat belt 2 passes. The belt 2 retains the insertion portion 12 then so that it is free to slide along the belt 2.

The base cushion 4 of the wearers seat is adapted to be curled up around their legs if a belt tensioner deploys during an accident.

Figure 2:
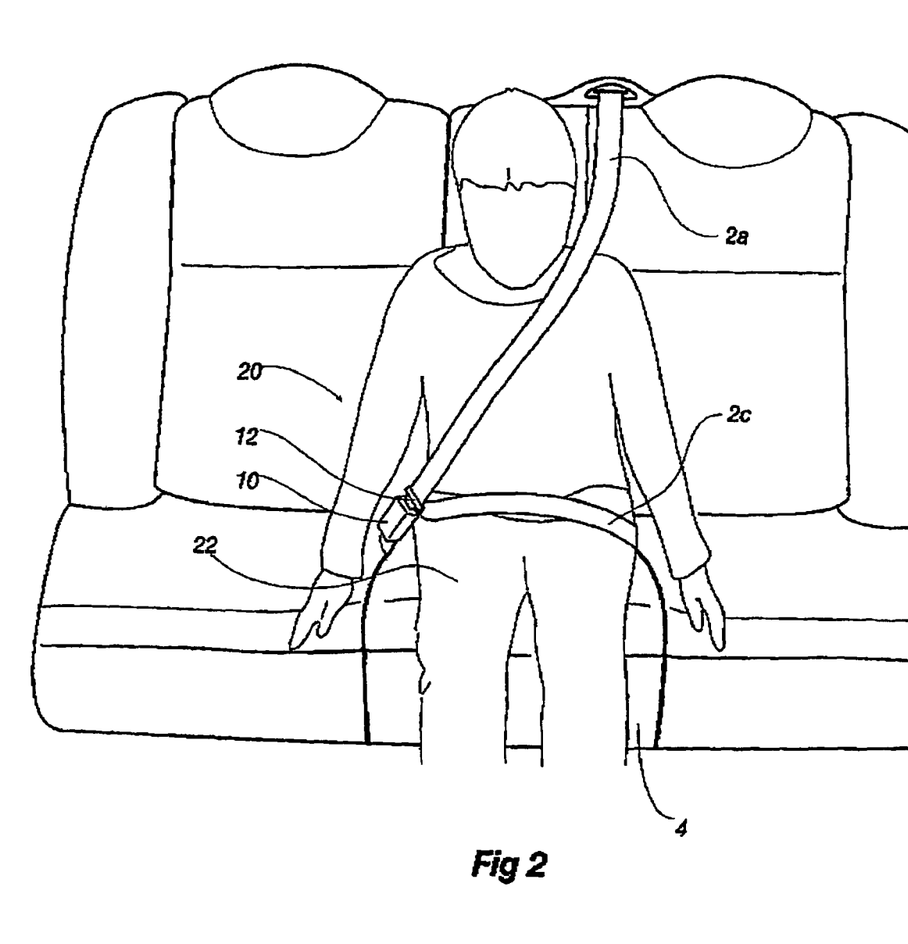
FIGS. 2 and 5 are perspective views of the vehicle seat in FIG. 1, retaining a vehicle occupant in their seat.

In use, a vehicle occupant sits 20 in the seat 1 and takes hold of the insertion 12 portion of the seat belt buckle. They then draw this across their body towards the receiving portion 10, and releasably engage the two portions of the belt buckle. In doing so, one portion of the seat belt 2a is drawn diagonally across their chest, and another portion 2c passes low across their thighs, while portion 2b passes beneath the seat.

In the event of a collision, the belt pretensioner will activate, pulling firmly on the belt 2. This will pull the bar 102 of the belt guide 104 down against the springs 108, increasing the extent to which the belt 2 wraps over and around the wearers shoulder (over their a-c joint). This limits the wearer's ability to slide sideways from beneath the belt (particularly in side impacts). The belt pretensioner also pulls the belt 2 firmly around the wearer's legs 22 and across their chest. This will also cause part of the seat base cushion 4 to be wrapped up and around the legs 22 of wearer 20 (see FIG. 5).

Figure 5:
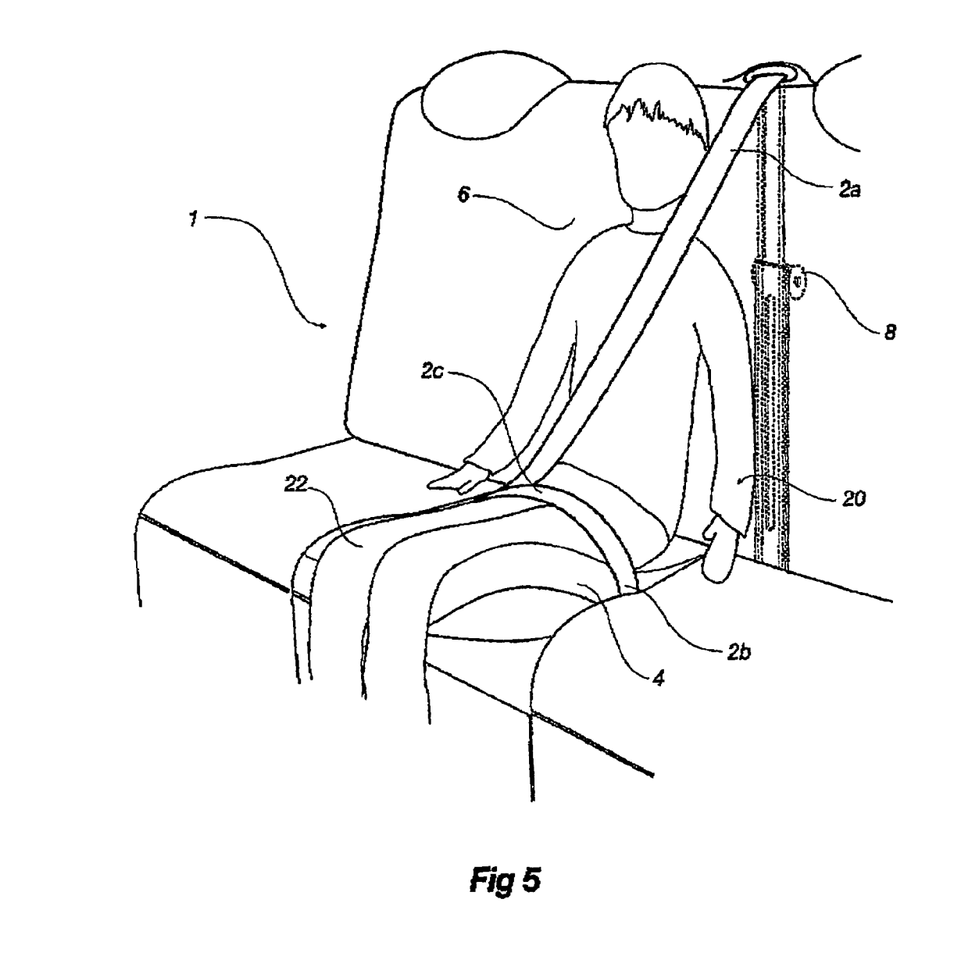

The position of the belt 2 around the legs 22 of wearer and the distortion of the seat base cushion 4 then co-operates to prevent the wearer from submarining out of the belt. Similarly, the action of the belt guide 100 will prevent the wearer from being flung forwards from beneath the belt 2, a motion often referred to a 'jack-knifing'.

A significant advantage of mounting this seat belt restraint system to a seat frame is that this creates a seat module, to which the occupant is restrained. This is preferable to having a seat belt that is anchored to a portion of the vehicles roof structure (such as a roof pillar for instance), which may be significantly damaged in a collision, thereby reducing the degree of restraint provided to the wearer of the belt.

A seat module offers further advantages because it is better attached to its human cargo and can move with this cargo in a collision. It is by design more akin to a baby capsule. A module can have passive and/or active attachment points to the vehicle. The advantages of this might be best described by way of example, using two commonly injurious scenarios:

1. Rear-end collision—The seat flexes with the tightly secured human eliminating head-headrest strike (so that whiplash injury is reduced); and
2. Rollover collision—The seats actively roll backwards in a knee-up, head down position (so that head/neck injury is reduced). This is achievable if a seat mount is deliberately released so that the seat action can mimic a "rocking chair".

Figure 6:
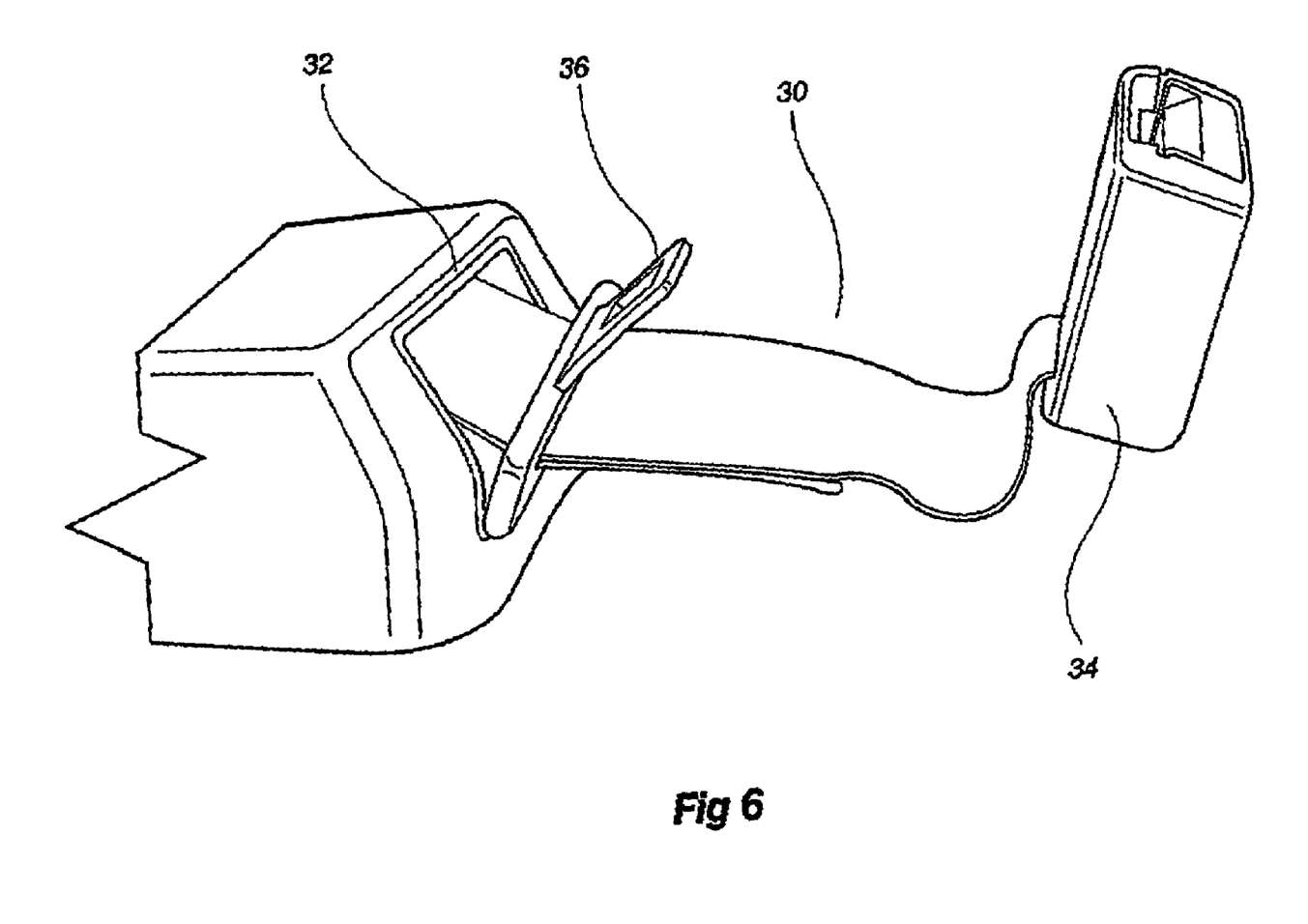
FIG. 6 is a perspective view of a seat belt according to a further aspect of the invention.
Figure 7:
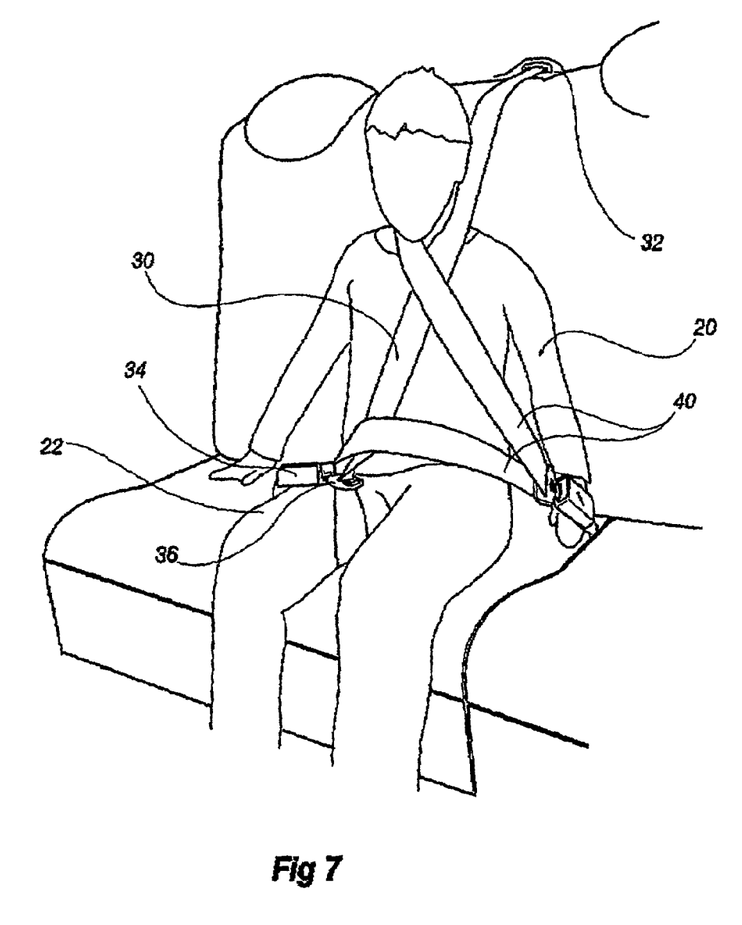
FIG. 7 is a perspective view of the seat belt in FIG. 6 retaining a vehicle occupant in their seat.

FIGS. 1 through 5 illustrate a dedicated system, in which the seat base cushion 4 is adapted to allow the belt 2 to pass beneath it. FIGS. 6 and 7, illustrate a further form of the invention, this one being suited for retrofittment to vehicles, yet still preventing submarining.

As before, the seat belt 30 has a first end that is anchored to the baby capsule anchor point of the vehicle via an inertia-reel mechanism 32, and a second end that retains a receiving portion 34 of a seat belt buckle. Once again, the insertion portion 36 of the seat belt buckle has a slot through it, through which the seat belt 30 passes. The belt 30 retains the insertion portion 36 then so that it is free to slide along the belt 30.

In use, the belt 30 is wrapped around the leg 22 of the wearer 20 and the two portions of the buckle are engaged. When used in connection with a three-point seat belt 40, the belt 30 is passed beneath the lap portion of three-point belt 40, and prevents the wearer 20 from submarining out from beneath the three-point belt 40. In addition to this, when the pretensioner for this belt 30 activates, the fact that it has been routed beneath the lap portion of the three-point belt 40 reduces the extent to which this portion of the three point belt can impart abdominal injuries on the wearer in the event of a collision.

Figure 8:
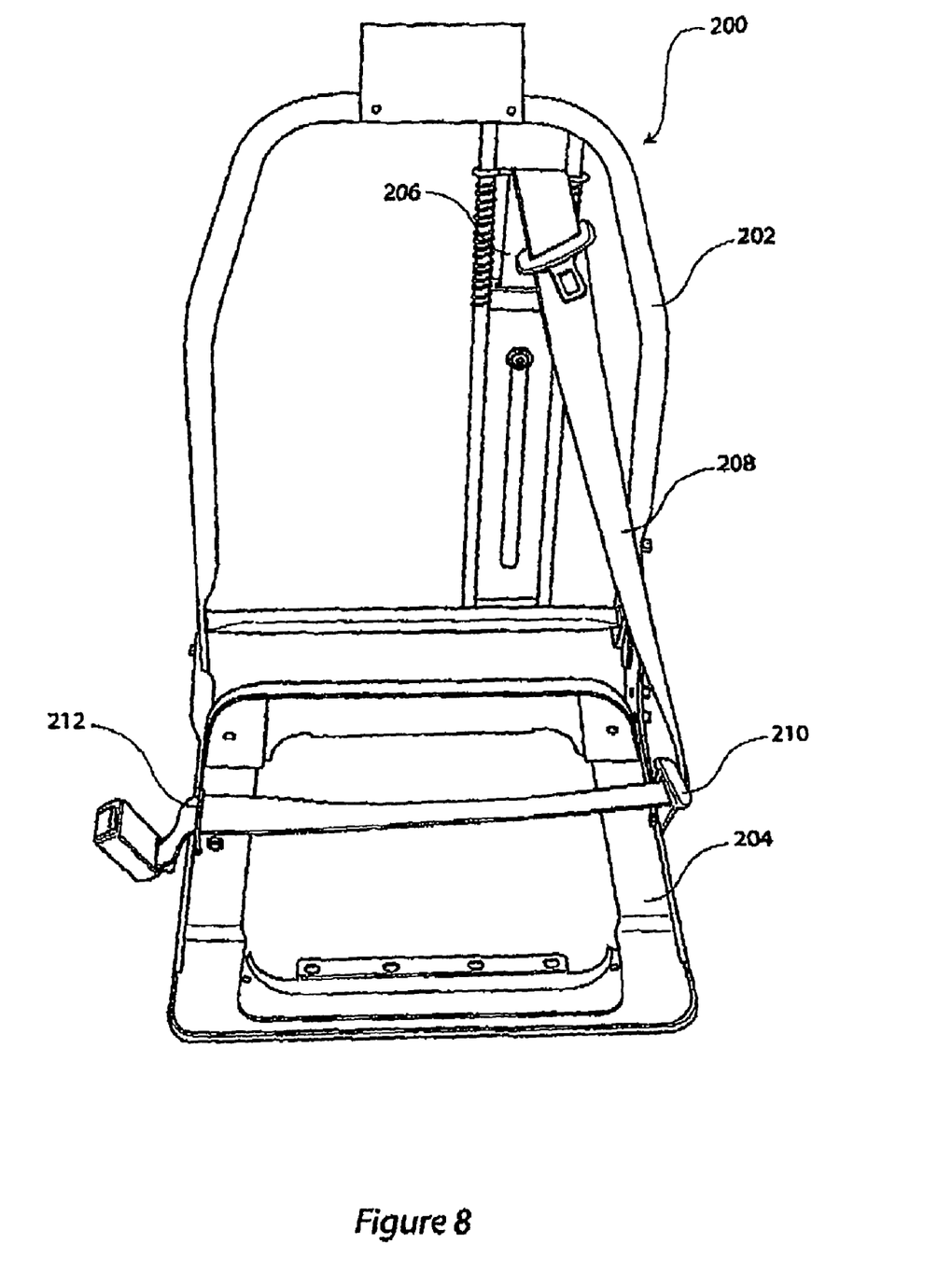
FIG. 8 is a perspective view of a frame for a seat belt restraint according to a further aspect of the invention.
Figure 9:
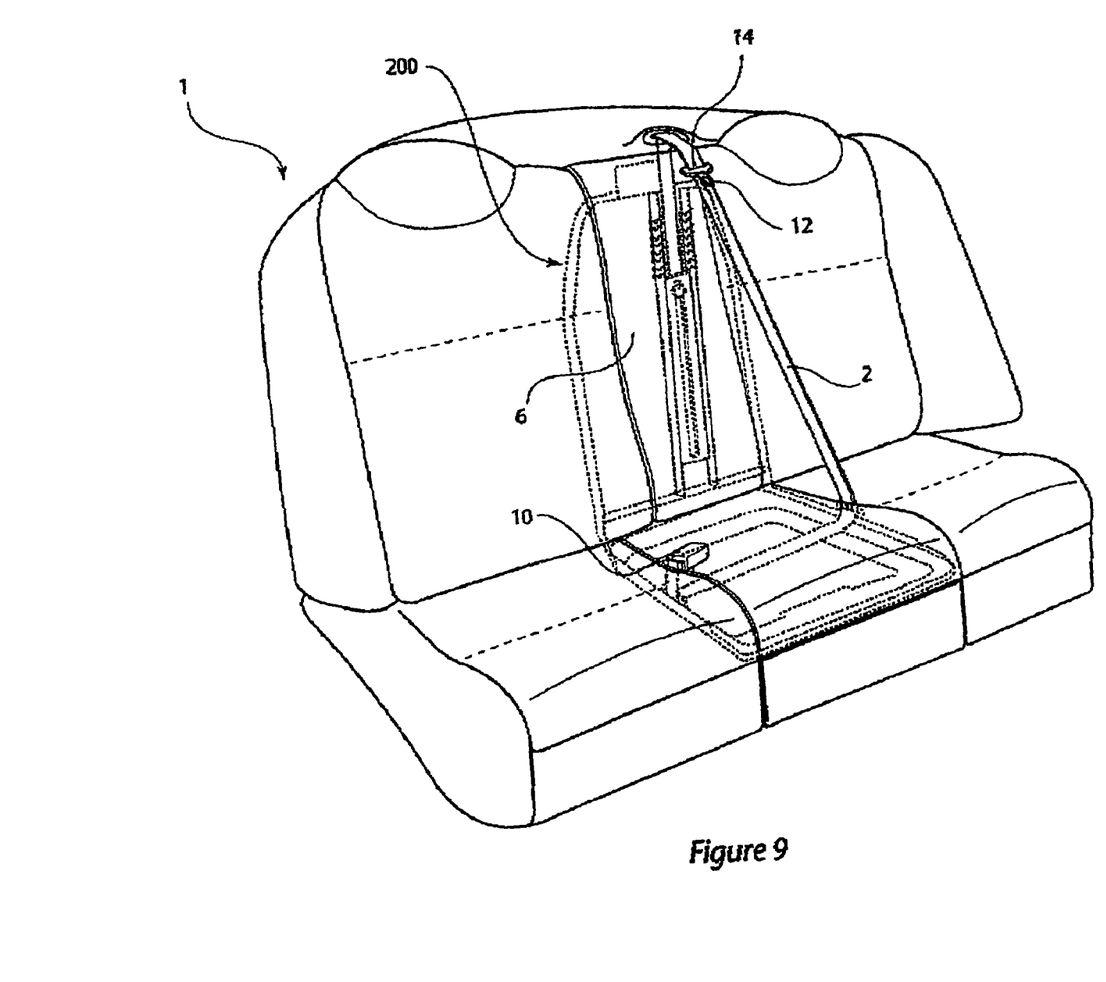
FIG. 9 is a perspective view of a vehicle seat incorporating the seat belt frame and restraint in FIG. 8.

Referring now to FIG. 8, where there is illustrated a seat frame 200 having a back portion 202 and a base portion 204. This frame 200 supports the vehicle seat cushions, as shown in FIG. 9 and is adapted to be bolted to the vehicle. The first end of the belt 206 is mounted to the back portion 202 of the seat frame 200 via an inertial reel mechanism, in much the same fashion as was discussed above. The belt 208 then passes through a pair of belt guides 210 and 212 fixed to the base portion 204 of the frame 200, one mounted to each side of the base portion 204 of the seat frame.

Figure 10:
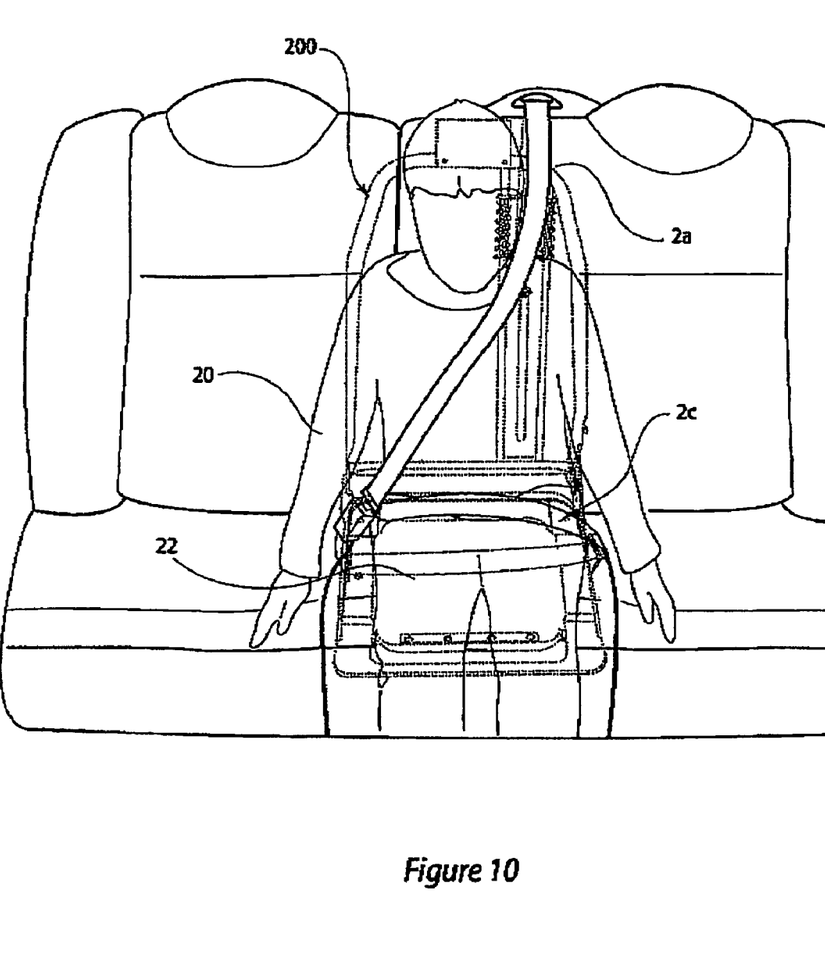
FIG. 10 is a perspective view of the vehicle seat and seat belt restraint in FIG. 9 restraining an occupant.

Each of these belt guides has a slot in it, through which the seat belt 208 passes. Referring now to FIG. 10, the purpose of these brackets 210 and 212 is to limit the extent to which the belt 208 can tighten around and thereby crush the legs 22 of the wearer in a severe impact.

Figure 11:
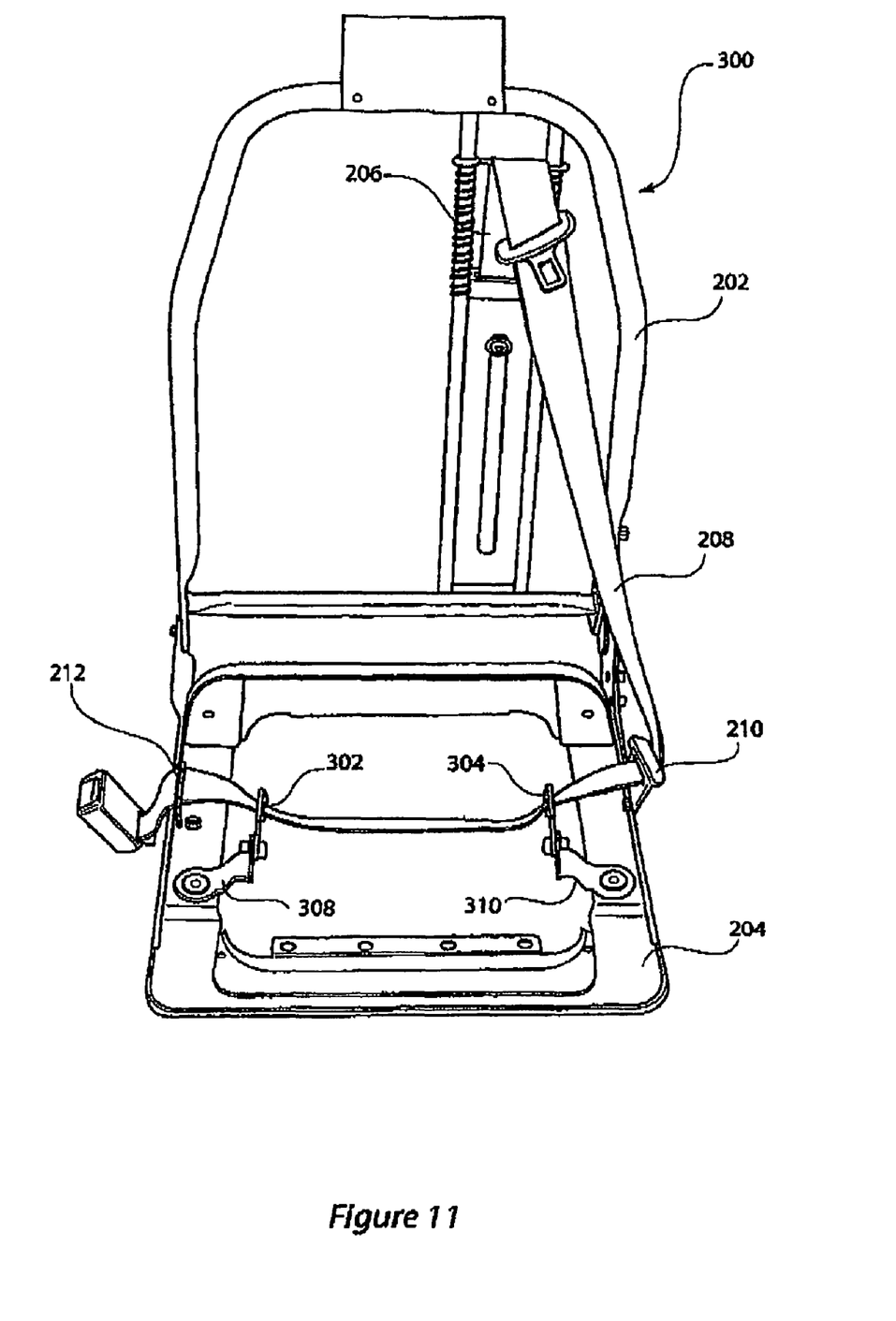
FIGS. 11 and 12 are perspective views of a frame for a seat belt restraint according to yet a further aspect of the invention.
Figure 12:
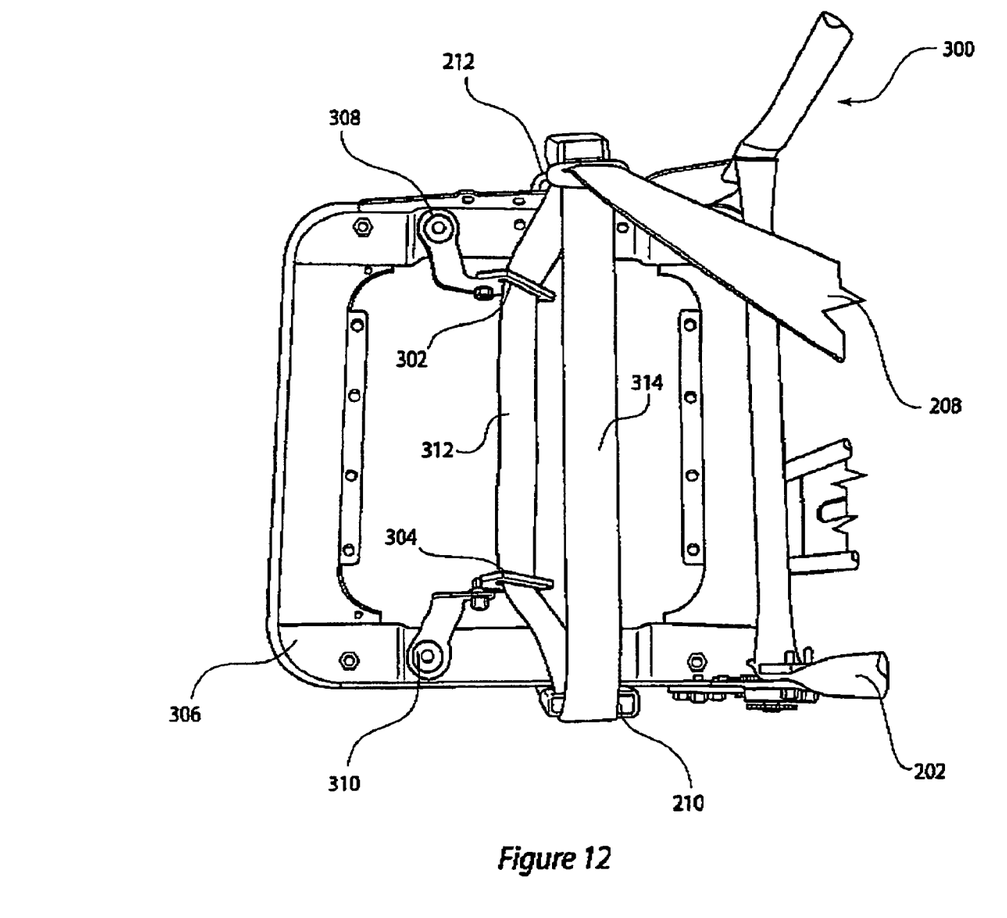

Referring now to FIGS. 11 and 12, where the seat frame 300 incorporates a pair of belt guides 302 and 304 connected to the base portion 306 of the seat frame 300 by brackets 308 and 310. These brackets 308 and 310 position these belt guides 302 and 304 so that the lower part 312 of the lap belt sits anterior to the "sit" or ischial bones of the wearer, while the upper part 314 of the lap belt sits anterior to the "pelvic" or iliac bones. It has been found that these are the ideal positions for these brackets, in that these positions provide the best balance between secure retention of the wearer, without creating excessive crushing pressure on their legs.

Although the invention has been herein shown and described in what is conceived to be the most practical and preferred embodiment, it is recognised that departures can be made within the scope of the invention, which is not to be limited to the details described herein but is to be accorded the full scope of the appended claims so as to embrace any and all equivalent devices and apparatus.

The invention claimed is:

1. A seat belt restraint including a single, continuous length of belt supporting at least two releasably engagable portions of a seat belt buckle, the belt having a first end which is adapted to fixed to an anchor point, a second end retaining a first portion of the seat belt buckle, the second portion of the seat belt buckle being adapted to releasably engage the first portion of the seat belt buckle, said second portion being retained by the belt so that it is free to slide along the belt.

2. A seat belt restraint as in claim 1, further comprising a seat, said anchor point being associated with said seat.

3. The seat belt restraint as in claim 2, wherein a portion of the belt passes beneath a portion of said seat, so that the anchor point and the first portion of the buckle are on opposite sides of the seat when the belt is not in use.

4. The seat belt restraint as in claim 3, wherein said seat includes a base portion and a back portion, and a portion of the belt passes beneath the base of the seat.

5. The seat belt restraint as in claim 4, wherein the base of the seat is adapted to be curled up around the legs of one sitting in the seat, when a belt pretensioner deploys.

6. The seat belt restraint as in claim 1, wherein the first portion of the seat belt buckle is a receiving portion, and the second portion is an insertion portion that is adapted to be inserted into and releasably engaged by the receiving portion.

7. The seat belt restraint as in claim 4, wherein there is an anchored belt guide positioned at or toward each side of the base of the seat.

8. The seat belt restraint as in claim 7, wherein the anchored belt guides are mounted to a base portion of a seat-supporting frame.

9. The seat belt restraint as in claim 7, wherein the anchored belt guides retain the belt such that the lower part of the lap belt sits interior to the "sit" or ischial bones, while the upper part of the lap belt sits interior to the "pelvic" or iliac bones.

10. The seat belt restraint as in claim 1, wherein the anchor point for the belt is a mount point for a baby capsule.

11. The seat belt restraint as in claim 1, wherein the seat belt restraint further includes an inertia reel mechanism and a belt pretensioner.

12. The seat belt restraint as in claim 2, wherein the assembly includes a belt guide, over which the belt passes, said guide being supported by biasing means.

13. The seat belt restraint as in claim 12, wherein when the belt pretensioner activates, the belt guide is pulled downward against the biasing means so as to increase the extent to which the belt wraps over the shoulder of the wearer.

14. The seat belt restraint as in claim 1, wherein the inertia reel mechanism and belt guide are mounted to the seat frame.

15. A method of wearing the seat belt as disclosed in claim 1, wherein a portion of the belt passes beneath the seat so that the receiving portion of the buckle is accessible to a first side of the wearer, and the insertion portion of the buckle is drawn from the other side of the wearer and releasably engaged by the receiving portion, thereby looping the belt around both the legs of the wearer and the seat portion beneath the wearer's legs.

16. The method of wearing the seat belt as in claim 15, wherein the belt is wrapped around a leg of the wearer, and the two portions of the seat belt buckle are releasably engaged.

* * * * *